US010375736B2

United States Patent
Lin et al.

(10) Patent No.: US 10,375,736 B2
(45) Date of Patent: Aug. 6, 2019

(54) METHODS AND APPARATUSES FOR RANDOM ACCESS

(71) Applicant: TELEFONAKTIEBOLAGET LM ERICSSON (PUBL), Stockholm (SE)

(72) Inventors: Zhipeng Lin, Nanjing (CN); Gustav Almquist, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 61 days.

(21) Appl. No.: 15/543,945

(22) PCT Filed: Jun. 12, 2017

(86) PCT No.: PCT/CN2017/087924
§ 371 (c)(1),
(2) Date: Jul. 14, 2017

(87) PCT Pub. No.: WO2018/205337
PCT Pub. Date: Nov. 15, 2018

(65) Prior Publication Data
US 2018/0332622 A1    Nov. 15, 2018

(30) Foreign Application Priority Data

May 12, 2017 (WO) ................ PCT/CN2017/084258

(51) Int. Cl.
*H04L 5/00*       (2006.01)
*H04W 74/08*    (2009.01)
(Continued)

(52) U.S. Cl.
CPC ..... *H04W 74/0833* (2013.01); *H04L 25/0224* (2013.01); *H04W 56/0045* (2013.01)

(58) Field of Classification Search
None
See application file for complete search history.

(56) References Cited

U.S. PATENT DOCUMENTS

2004/0032849 A1* 2/2004 Tang ...................... H04L 1/0006
370/342
2016/0050660 A1* 2/2016 Hofstrom .............. H04W 76/10
370/329
(Continued)

FOREIGN PATENT DOCUMENTS

CN          106605432 A         4/2017

OTHER PUBLICATIONS

"New WID on Radio Interface Enhancements for EC-GSM-IoT," Sep. 19-22, 2016, 7 pages, 3GPP TSG RAN Meeting #73, RP-161806, Nokia, Alcatel-Lucent Shanghai Bell, Orange, Ericsson LM, Sierra Wireless S. A., MediaTek Inc., New Orleans, US.
(Continued)

*Primary Examiner* — Sithu Ko
(74) *Attorney, Agent, or Firm* — NDWE LLP (57) ABSTRACT

Methods and apparatuses for random access transmission. A method implemented in a terminal device in a wireless communication system. According to the method, a random access request including a training sequence is generated. The training sequence is configured at least partially based on a requirement of a coverage gain for a predetermined coverage class five (CC5) of the terminal device. The random access request is transmitted to a network device on a random access channel.

18 Claims, 6 Drawing Sheets

(51) Int. Cl.
    *H04W 56/00*     (2009.01)
    *H04L 25/02*     (2006.01)

(56) References Cited

U.S. PATENT DOCUMENTS

2016/0157251 A1\* 6/2016 Schliwa-Bertling .... H04W 4/70 370/315
2017/0064743 A1\* 3/2017 Lei ..................... H04W 74/0833

OTHER PUBLICATIONS

"Radio interface enhancements for EC-GSM-IoT—New coding scheme RACH11' and extended synchronization access burst for EC-RACH CC5," May 15-19, 2017, 5 pages, 3GPP TSG RAN WG6 #4, Tdoc R6-17xxxx, Ericsson LM, Hangzhou, China.

"3rd Generation Partnership Project; Technical Specification Group Radio Access Network; GSM/EDGE Multiplexing and multiple access on the radio path (Release 14)," Mar. 2017, 142 pages, 3GPP TS 45.002, V14.1.0, 3GPP Organizational Partners.

"Comparison of EC-RACH CC5 alternatives," May 15-19, 2017, 6 pages, 3GPP TSG RAN WG6 #4, Tdoc R6-170186, Ericsson, Hangzhou, China.

"EC-EGPRS, Intended Scope of Training Sequence Design for EC-RACH and EC-SCH (revision of GP-151106)," Nov. 16-20, 2015, 3 pages, 3GPP TSG GERAN#68, GP-151106, Ericsson, Anaheim, US.

"3rd Generation Partnership Project; Technical Specification Group Radio Access Network; GSM/EDGE Radio transmission and reception (Release 13)," Mar. 2017, 290 pages, 3GPP TS 45.005, V13.4.0, 3GPP Organizational Partners.

Ericsson, "TSC design and evaluation for EC-RACH CC5 using ESAB," May, 15-19, 2017, 3GPP TSG RAN6 #4, R6-170225, 10 pages.

International Search Report and Written Opinion for Application No. PCT/CN2017/087924, dated Jan. 29, 2018, 12 pages.

Nokia, "New Uplink Coverage Class CC5—EC-RACH Training Sequence Design," 3GPP TSG RAN WG6 #3, R6-170066, Feb. 13-17, 2017, 5 pages.

\* cited by examiner

METHODS AND APPARATUSES FOR RANDOM ACCESS

CROSS-REFERENCE TO RELATED APPLICATIONS

This application is a National stage of International Application No. PCT/CN2017/087924, filed Jun. 12, 2017, which claims priority to International Application No. PCT/CN2017/084258, filed May 12, 2017, which are all hereby incorporated by reference.

TECHNICAL FIELD

Embodiments of the present disclosure generally relate to the field of telecommunication, and in particular, to methods and apparatuses for random access.

BACKGROUND

Radio access technologies are developing as increasing of communication demands in various aspects. For example, a new cellular scenario known as Internet of Things (IoT) is exposing existing radio access technologies to new stringent requirements in terms of extended coverage, longer battery lifetime, and improved capacity. Some radio access technologies targeted for IoT, such as, Extended Coverage Global System for Mobile-IoT (EC-GSM-IoT) have been studied to meet the new requirements by introducing new features into communication systems. There is a new work item (WI) on Radio Interface Enhancements for EC-GSM-IoT, aiming at introducing a new uplink coverage class (CC) in addition to four existing CCs (CC1 to CC4). This new CC is referred to as CC5, and the traditional CCs are referred to as legacy CCs. With introduction of the new features, such as the new uplink CC, various communication procedures need to be reconfigured to achieve improvements brought by the new features.

SUMMARY

In general, example embodiments of the present disclosure provide methods and apparatuses for random access.

In a first aspect, there is provided a method implemented in a terminal device in a wireless communication system. According to the method, a random access request including a training sequence is generated. The training sequence is configured at least partially based on a requirement of a coverage gain for a predetermined coverage class five, CC5, of the terminal device. The random access request is transmitted to a network device on a random access channel.

In some embodiments, a length of the training sequence is in a range from 100 bits to 180 bits.

In some embodiments, the length of the training sequence includes a length of 140 bits.

In some embodiments, the training sequence is configured as 1 1 1 0 1 1 1 0 1 1 0 0 0 1 1 1 0 0 0 0 0 1 0 0 1 1 1 1 0 1 0 0 1 0 0 1 1 1 0 0 1 0 0 0 1 1 0 1 1 0 1 0 0 1 1 1 0 0 0 1 1 1 1 0 1 0 1 0 1 0 1 1 0 1 1 0 0 1 0 1 1 1 0 0 0 1 1 1 0 1 1 1 1 1 1 1 0 1 0 1 1 0 1 0 1 1 1 0 1 0 0 0 0 0 1 1 0 1 1 0 1 1 1 1 1 0 1 1 1 1 0 0 1 1 1 0 0 1 0.

In some embodiments, the training sequence is configured further based on one or more of the following: an auto-correlation of the training sequence, a cross-correlation between the training sequence and one or more further training sequences for one or more further coverage classes, and an interference between the random access channel and one or more further random access channels.

In some embodiments, the random access channel includes an extended coverage random access channel, EC-RACH.

In some embodiments, the wireless communication system is an Extended Coverage Global System for Mobile Internet of Things, EC-GSM-IoT, system.

In some embodiments, generating the random access request including the training sequence comprises: in response to receiving an indication that the network device supports the training sequence, generating the random access request including the training sequence.

In a second aspect, there is provided a method implemented in a network device in a wireless communication system. The method includes receiving a random access request from a terminal device on a random access channel. The method also includes detecting a training sequence in the random access request. The training sequence is configured at least partially based on a requirement of a coverage gain for a predetermined coverage class five, CC5, of the terminal device.

In some embodiments, the method further includes performing channel estimation based on the detected training sequence.

In some embodiments, the method further includes determining timing advance for an uplink from the terminal device to the network device based on the detected training sequence.

In some embodiments, a length of the training sequence is in a range from 100 bits to 180 bits.

In some embodiments, the length of the training sequence includes a length of 140 bits.

In some embodiments, the training sequence is configured as 1 1 1 0 1 1 1 0 1 1 0 0 0 1 1 1 0 0 0 0 0 1 0 0 1 1 1 1 0 1 0 0 1 0 0 1 1 1 0 0 1 0 0 0 1 1 0 1 1 0 1 0 0 1 1 1 0 0 0 1 1 1 1 0 1 0 1 0 1 0 1 1 0 1 1 0 0 1 0 1 1 1 0 0 0 1 1 1 0 1 1 1 1 1 1 1 0 1 0 1 1 0 1 0 1 1 1 0 1 0 0 0 0 0 1 1 0 1 1 0 1 1 1 1 1 0 1 1 1 1 0 0 1 1 1 0 0 1 0.

In some embodiments, the training sequence is configured further based on one or more of the following: an auto-correlation of the training sequence, a cross-correlation between the training sequence and one or more further training sequences for one or more further coverage classes, and an interference between the random access channel and one or more further random access channels.

In some embodiments, the random access channel includes an EC-RACH.

In some embodiments, the wireless communication system is an EC-GSM-IoT system.

In some embodiments, the method further includes transmitting, to the terminal device, an indication that the network device supports the training sequence.

In a third aspect, there is provided an apparatus at a terminal device in a wireless communication system. The apparatus includes a processor; and a memory coupled to the processing unit and storing instructions thereon, the instructions, when executed by the processing unit, causing the apparatus to perform the method according to the first aspect.

In a fourth aspect, there is provided an apparatus at a network device in a wireless communication system. The apparatus includes a processor; and a memory coupled to the processing unit and storing instructions thereon, the instructions, when executed by the processing unit, causing the apparatus to perform the method according to the second aspect.

In a fifth aspect, there is provided a computer program product that is tangibly stored on a computer readable storage medium. The computer program product includes instructions which, when executed on at least one processor, cause the at least one processor to carry out the method according to the first aspect or the second aspect.

In a sixth aspect, there is provided a computer readable storage medium having instructions stored thereon. The instructions, when executed on at least one processor, cause the at least one processor to carry out the method according to the first aspect or the second aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a Remote Radio Unit (RRU), a radio head (RH), a remote radio head (RRH), a low power node such as a femto node, a pico node, and the like. For the purpose of discussion, in the following, some embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. In some examples, the terminal device includes an Internet of Things (IoT) device which is the network of physical objects or "things" embedded with electronics, software, sensors, and connectivity to enable objects to exchange data with the manufacturer, operator and/or other connected devices. For the purpose of discussion, in the following, some embodiments will be described with reference to UEs as examples of terminal devices and the terms "terminal device" and "user equipment" (UE) may be used interchangeably in the context of the present disclosure.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Figure 1:
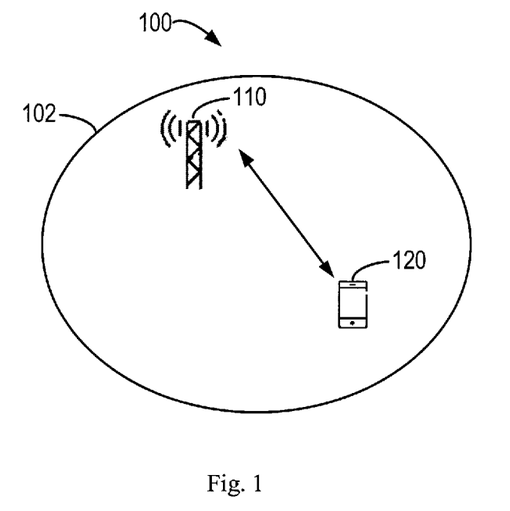
FIG. 1 is a block diagram of a communication environment in which embodiments of the present disclosure can be implemented.

FIG. 1 shows an example communication network 100 in which embodiments of the present disclosure can be implemented. The network 100 includes a network device 110 and a terminal device 120 served by the network device 110. The serving area of the network device 110 is called as a cell 102. It is to be understood that the number of network devices and terminal devices is only for the purpose of illustration without suggesting any limitations. The network 100 may include any suitable number of network devices and terminal devices adapted for implementing embodiments of the present disclosure. Although not shown, it would be appreciated that one or more terminal devices may be located in the cell 102 and served by the network device 110.

The communications in the network 100 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In the communication network 100, the network device 110 can communicate data and control information to the terminal device 120 and the terminal device 120 can also communication data and control information to the network device 110. A link from the network device 110 to the terminal device 120 is referred to as a downlink, while a link from the terminal device 120 to the network device 110 is referred to as an uplink.

As mentioned above, radio access technologies for communications have been developed and new features have been introduced. Specifically, there is introduced a new coverage class (CC) in addition to four existing CCs (CC1 to CC4). This new CC is referred to as CC5, and the traditional CCs are referred to as legacy CCs. In uplink communication, different coverage classes can provide different coverage gains for terminal devices, where CC4 provides a higher coverage gain than CC3, CC3 provides a higher coverage gain than CC2, and so on. The new CC5 is designed to provide at least 3 dB additional coverage gain compared to the existing CC4. This new coverage class CC5 may be suitable for communications of IoT devices with limited power. In some implementations, CC5 may be targeted for the low power devices (−23 dbm) for EC-GSM-IoT enhancement.

With introduction of the new coverage class, requirements of high coverage apply to most channels in cellular systems. One channel of particular interest is the Random Access Channel (RACH) or Extended Coverage RACH (EC-RACH) which is typically collision-based and used to support initial system access by terminal devices (for example, IoT devices). During random access, the terminal device 120 may transmit in uplink a random access request including a training sequence (TS, which is also referred to as a training sequence code (TSC) or a synchronization sequence) on a RACH or EC-RACH. The training sequence may facilitate the reception of the random access request at the network device.

In legacy RACH or EC-RACH, the training sequence includes 41 bits, which might help achieve a coverage gain enough for the terminal devices in legacy coverage classes. However, in new coverage classes which require higher coverage gains, if the legacy training sequences are directly used for communication, especially for random access, it is impossible to achieve the targeted coverage gain.

In order to address at least some of the above problems and other potential problems, according to embodiments of the present disclosure, there is proposed a solution for random access. In this solution, a new training sequence is introduced for a coverage class five (CC5) in random access. This training sequence is configured based on a requirement of a coverage gain for a terminal device. Random access between the terminal device in CC5 and a network device can be performed based on the training sequence, thereby meeting the requirement of the coverage gain.

Figure 2:
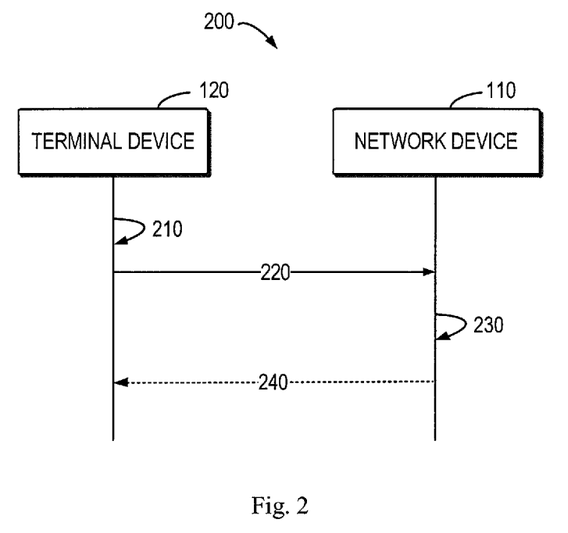
FIG. 2 is a flowchart illustrating a process for random access according to some other embodiments of the present disclosure.

Principle and implementations of the present disclosure will be described in detail below with reference to FIG. 2, which shows a process 200 for random access according to an embodiment of the present disclosure. For the purpose of discussion, the process 200 will be described with reference to FIG. 1. The process 200 may involve the network device 110 and the terminal device 120 in FIG. 1.

The terminal device 120 generates (210) a random access request including a training sequence (TS). The training sequence is configured at least partially based on a requirement of a coverage gain for a CC5 of the terminal device 120. In embodiments of the present disclosure, the training sequence, which is also referred to as a training sequence code (TSC) or a synchronization sequence, can be used for the terminal device 120 to perform random access request. This training sequence is thus configured based on the coverage gain required for CC5. It is now agreed that CC5 can provides at least 3 dB additional coverage gain compared to a lower coverage class, CC4.

Typically, in addition to the training sequence, the random access request may include data and/or other information. The random access request may be transmitted as a burst to the terminal device. Such a burst is referred to as an access burst (AB). In some examples, the burst is an Extended Synchronization Access Burst (ESAB). In these cases, the total length of the random access request is limited and thus the length of the training sequence included therein is limited. In some embodiments, to meet the requirement of the coverage gain, the length of the proposed training sequence for CC5 is in a range from 100 bits to 180 bits. In a specific embodiment, the length of the training sequence includes a length of 140 bits.

In addition to the factor of the coverage gain requirement, the proposed training sequence may further be configured by considering other factors such as correlation and interference introduced in the communication after utilizing this training sequence. In some embodiments, one or more of the following factors may be taken into account: an auto-correlation of the proposed training sequence, a cross-correlation between the proposed training sequence and one or more further training sequences for one or more further coverage classes, and an interference between the random access channel for transmitting the proposed training sequence and one or more further random access channels. In some embodiments, the further coverage classes include legacy coverage classes in existing communication systems, such as any of CC1 to CC4. Thus, the further training sequences include legacy training sequences for the legacy coverage classes in existing communication systems. In some embodiments, one or both of the cross-correlations between training sequences in a co-channel and in adjacent channels can be measured as a factor in determining the training sequence for CC5. Alternatively or in addition, one or both of the interference between training sequences in a co-channel and in adjacent channels can be measured. In some embodiments, the proposed training sequence is configured to provide a high auto-correlation, and/or low interference and/or low cross-correlations with other sequences transmitted on other channels.

Taking various factors as mentioned above into account, in an example, the training sequence may be configured in bits in the following Table 1.

TABLE 1

Training sequence for CC5

| TS | Training sequence bits |
|---|---|
| 8 | 1110111011000111000001001111010010011100100011011010011100011110101010110110010111000111011111111101011010111010000011011011111011110011 10010 |

Since there are already eight defined training sequences (TS0 to TS7) configured for random access in communication systems, this training sequence proposed herein may also be referred TS8. The training sequence proposed herein, especially the one listed in Table 1, can be compared with legacy training sequence(s) to show that this training sequence can achieve a high auto-correlation, and/or low interference and/or low cross-correlations. The comparison and the results will be illustrated below.

According to embodiments of the present disclosure, the terminal device 120 may be preconfigured with the training sequence. When generating the random access request, the terminal device 120 may include this training sequence into the random access request. In some embodiments, the terminal device 120 may decide to include the configured training sequence in the random access request based on a determination of being in CC5 and/or an indication that the network device 110 supports this training sequence. This indication may be provided by the network device 110 in system information (SI) to tell all the terminal devices (including the terminal device 120) in the serving cell 102 that EC-RACH CC5 is supported and thus the proposed training sequence can be included in the random access request.

The terminal device 120 may generate the random access request including the training sequence to initiate random access. In some examples, the terminal device 120 may automatously initiate the random access if needed or may be triggered by the network device 110 (for example, by a paging message from the network device 110). Upon generating the random access request, the terminal device 120 transmits (220) the random access request on a random access channel (RACH) to the network device 110. Each transmission of the random access request may be regarded as one or more access bursts. In some embodiments, the random access channel includes an extended coverage random access channel, EC-RACH. In these embodiments, CC5 may be referred to EC-RACH CC5.

The network device 110 receives the random access request transmitted by the terminal device 120 on the random access channel and detects (230) the training sequence in the random access request. The training sequence is also configured in the network device 110 and is used by the network device 110 to detect that the received random access request includes such a sequence for CC5.

The random access transmission between the network device 110 and the terminal device 120 may be used for various purposes. In some embodiments, if the training sequence is detected as including in the random access request, the network device 110 may perform channel estimation based on the detected training sequence. The results of channel estimation may be further used to implement error cancellation, equalization, and so on. In cases where the random access request includes data, the network device 110 may also decode the data through the error cancellation, equalization, and/or the like. In some embodiments, the network device 110 may also determine timing advance (TA) for the uplink from the terminal device 120 to the network device 110 based on the detected training sequence. The training sequence configured at the network device 110 is used as a reference sequence in the channel estimation and the determination of TA.

As mentioned above, the training sequence for CC5 can exhibit great properties in various aspects such as interference and correlation. To illustrate these properties, the training sequence proposed herein (referred to as TS8 hereinafter) has been evaluated by both link level simulations for interference and correlations with one or more other TSs (legacy TSs). The evaluation and the performance comparison will now be described in the following.

With simulation assumptions shown in Table 2, link level performance of EC-RACH CC5 using ESAB and TS8 with random bit interference is compared to that using a temporary TS (a 140 bit TS concatenated from 4 legacy TSs, including TS4, TS5, TS6, TS7) used for the initial link level performance evaluation of ESAB. It is also compared to the link level performance requirement of 2TS EC-RACH CC4 defined in a specification of a third Generation Partner Project (3GPP) (3GPP TS45.005).

TABLE 2

Simulation assumptions

| Parameter | Setting |
|---|---|
| Channel models | TU1.2, TU50, ST (sensitivity case only) |
| BAND | 900 |
| Repetition scheme | 66 ESABs per access attempt |
| Diversity | Maximum Ratio Combining (MRC) |
| Interferer | Random bits are used as interferers for both the co-channel interference (CCI) case and the adjacent channel (adj-channel) interference (ACI) case |

Performance comparisons are provided for sensitivity case in Table 3, ACI case in Table 4 and CCI case in Table 5, where Perf_tmpTS is the performance when the temporary TS mentioned above is used, Perf_TS8 is the performance when the proposed TS8 is used, and Perf_CC4 is the performance requirement defined for 2 TS EC-RACH CC4.

As can be seen from Tables 3-5, by using TS8, for all sensitivity and interference cases, the performance is better than that when using the temporary TS used for providing the initial link level performance of ESAB in traditional methods. Moreover, the performance gain compared to the performance requirement of 2TS EC-RACH CC4 is much more than the target of 3 dB, which allows for an increased margin for EC-RACH CC5 (collision based) relative to the margin applicable to the data channels.

TABLE 3

Sensitivity performance comparison to performance with the temporary TS and performance of 2TS EC-RACH CC4

| Channel Model | Perf_tmpTS-Perf_TS8 [dB] | Perf_CC4-Perf_TS8 [dB] |
|---|---|---|
| TU1.2 | 0.0407 | 5.14 |
| TU50 | 0.1102 | 5.51 |
| ST | 0.0953 | 4.74 |

TABLE 4

ACI performance comparison to performance with the
temporary TS and performance of 2TS EC-RACH CC4

| Channel Model | Perf_tmpTS-Perf_TS8 [dB] | Perf_CC4-Perf_TS8 [dB] |
|---|---|---|
| TU1.2 | 0.3165 | 6.73 |
| TU50 | 0.5354 | 7.08 |

TABLE 5

CCI performance comparison to performance with the
temporary TS and performance of 2TS EC-RACH CC4

| Channel Model | Perf_tmpTS-Perf_TS8 [dB] | Perf_CC4-Perf_TS8 [dB] |
|---|---|---|
| TU1.2 | 0.046 | 7.01 |
| TU50 | 0.0468 | 7.49 |

TS8 is further evaluated with link level simulations for co-channel interference and adjacent-channel interference cases when interfered by other legacy EC-RACH and RACH TSs. Simulation assumptions are specified in Table 6.

TABLE 6

Simulation assumptions

| Parameter | Setting |
|---|---|
| Channel models | TU1.2, TU50 |
| BAND | 900 |
| Repetition scheme | 66 ESAB per access attempt |
| Receiver | In-phase/Quadrature (IQ) accumulation between Time Division Multiple Access (TDMA) frames within each multi-frame, and soft combining between multi-frames |
| Diversity | MRC |
| Interferer | Legacy TSs are randomly selected as interferers for each burst |

It may be important that a legacy TS interfered by TS8 is not degraded too much in performance since they may be co-existed in a system. In general, the performance for TS k interfered by TS p depends on the auto-correlation of k and the cross-correlation between k and p, as given in the following Equation (1).

$$\hat{h}_k = h_k + (S_k^H S_k)^{-1} S_k^H S_p h_p + \text{error} \quad (1)$$

This Equation (1) represents a channel estimation error contribution from interfering TS. S is the least squares regression matrix, h is the channel and "error" is the model error and noise.

Accordingly, the performance for k interfered by p and the performance for p interfered by k are not the same. Since the new sequence TS8 is evaluated with legacy TS interference, both the auto-correlation of the new sequence and the cross-correlation between the new sequence and the legacy TS sequences are taken into consideration. Considering that the new TS8 is supposed to be used by low power devices, the interference it presents to other TSs would be low. Hence, evaluating legacy TSs interfered by the new TS8 would not add much to this evaluation.

Table 7 shows comparison of co-channel performance of EC-RACH CC5 (Perf_TS8) using TS8 when interfered by co-channel TSs resulting from: RACH accesses from legacy, PEO, or CC1 terminal devices; or EC-RACH accesses from CC2, CC3 and CC4 terminal devices. As can be seen in Table 7, even in case of the interference from co-channel TSs, EC-RACH CC5 using TS8 (Perf_TS8) can still achieve at least 4.5 dB gain compared to 2TS EC-RACH CC4 (Perf_CC4).

TABLE 7

CCI performance comparison between 2TS EC-RACH
CC5 using TS8 and the performance of 2TS EC-RACH CC4

| Channel Model | Perf_CC4-Perf_TS8 [dB] |
|---|---|
| TU1.2 | 4.53 |
| TU50 | 5.07 |

Table 8 shows comparison of adj-channel performance of EC-RACH CC5 (Perf_TS8) using TS8 when interfered by adjacent channel TSs resulting from: RACH accesses from legacy or CC1 terminal devices, or EC-RACH accesses from CC2, CC3, and CC4 terminal devices. As can be seen, even in case of interference from adjacent channel TSs, CC5 using TS8 can still achieve at least 6.4 dB gain compared to 2TS EC-RACH CC4 (Perf_CC4).

TABLE 8

ACI performance comparison between 2TS EC-RACH
CC5 using TS8 and the performance of 2TS EC-RACH CC4

| Channel Model | Perf_CC4-Perf_TS8 [dB] |
|---|---|
| TU1.2 | 6.4089 |
| TU50 | 6.9191 |

The performances of TS8 in interference cases are evaluated above. In the following, the auto-correlation of TS8 and cross-correlation with legacy TSs are also stimulated. For training sequences, it has been agreed in terms of auto-correlation and cross-correlation in communication specifications that:

"The training sequences shall be designed to have good auto-correlation";

"The EC-RACH training sequences shall be confirmed as not having too high cross correlation with 16QAM or 32QAM sequences"; and "The EC-RACH and EC-SCH training sequences shall be confirmed as not having too high cross correlation with Adj-channel interference cases when interfered by normal burst GMSK, 8PSK, 16QAM or 32QAM sequences."

Figure 3:
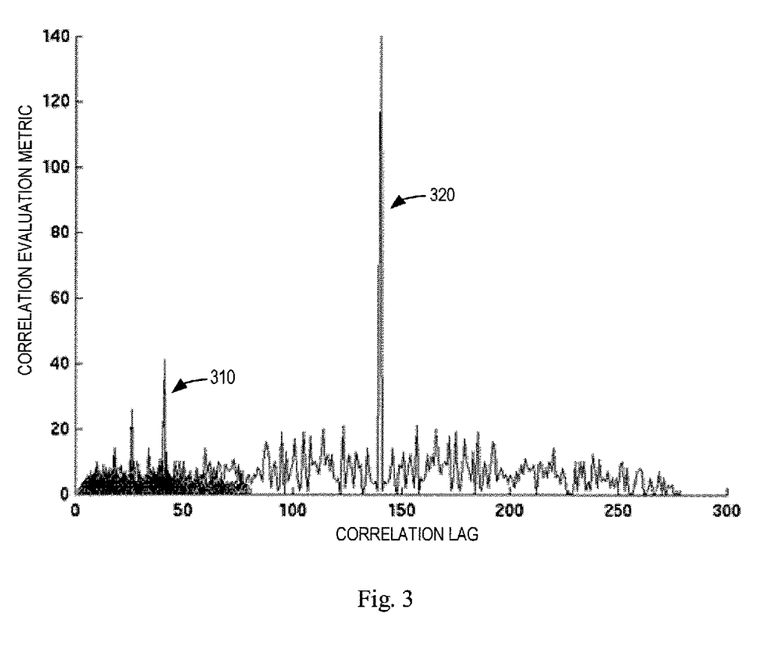
FIG. 3 is a diagram illustrating comparison of auto-correlations of legacy training sequences and a proposed training sequence in accordance with some embodiments of the present disclosure.

Auto-correlation is investigated in FIG. 3. The cross-correlation is evaluated in FIGS. 4A-5B, where the evaluation of the new TS is based on the absolute value of the deterministic real valued cross-correlation between the studied legacy training sequences and the proposed training sequence. For each correlation, it is supposed that $x1[n]$ (where $n=0, \ldots, N1-1$) is the symbols of the longest considered sequence, and the other sequence is denoted with $x2[n]$, where $n=0, \ldots, N2-1$, and $N2 \leq N1$. The sequences are zero outside the defined intervals. The evaluation metric is defined in the following Equation (2):

$$y[n+N_2] = \left| \sum_{m=-\infty}^{\infty} x_1[m] x_2[m-n] \right| \leq \begin{cases} N_2 - |n| & -(N_2-1) \leq n \leq 0 \\ N_2 & 0 < n \leq N_1 - N_2 \\ N_1 - |n| & N_1 - N_2 < n \leq N_1 - 1 \\ 0 & \text{otherwise} \end{cases} \quad (2)$$

For each case all possible cross-correlations are evaluated and plotted in the same figure. The goal of the evaluation is to make sure that the peak values for each lag are not larger than for the corresponding legacy evaluation, i.e. that the shapes of the plots are roughly the same.

FIG. 3 shows auto-correlation of TS8 320 and auto-correlation of a legacy TS (for example a legacy RACH/EC-RACH sequence, or a normal burst training sequence) 310. As can be seen, for both TS8 320 and legacy 310, high peak can be seen at lag zero positions and quite low peaks at other positions.

Figure 4A:
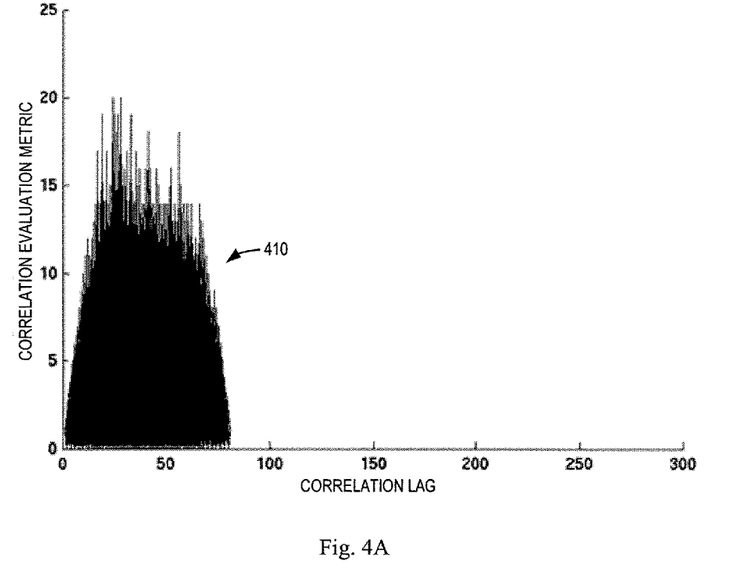
FIGS. 4A and 4B are diagrams illustrating cross-correlations between legacy training sequences and cross-correlations between a legacy training sequence and a proposed training sequence on a co-channel in accordance with some embodiments of the present disclosure.
Figure 4B:
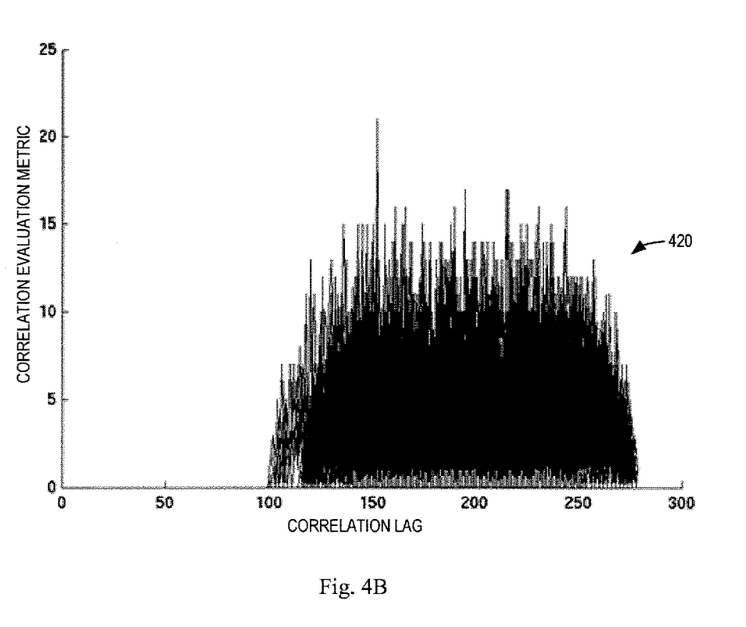

FIG. 4A shows cross-correlations 410 between any two TSs from legacy RACH/EC-RACH sequences and normal burst training sequences. FIG. 4B shows cross-correlations 420 between TS8 and legacy RACH/EC-RACH or normal burst training sequences. When comparing FIGS. 4A and 4B, it can be seen that the cross-correlation properties are similar for TS8 and legacy TSs investigated. That is, the peak values for each lag in FIG. 4B are not larger than for the corresponding legacy evaluation in FIG. 4A, and the shapes of the plots are roughly the same. There is only one maximum peak of value 21 in FIG. 4B while some peaks of value 20 in FIG. 4A which is roughly the same.

Figure 5A:
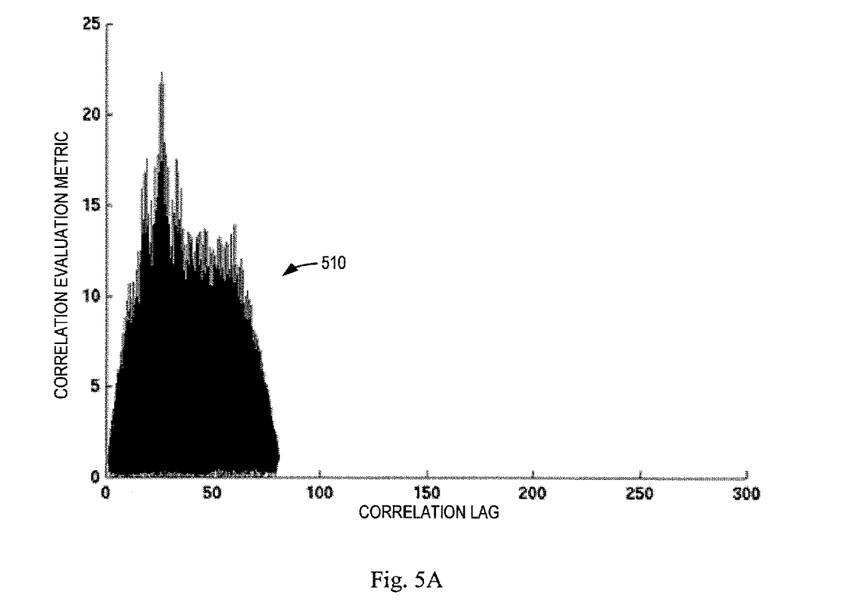
FIGS. 5A and 5B are diagrams illustrating cross-correlations between legacy training sequences on adjacent channels and cross-correlations between a legacy training sequence and a proposed training sequence on adjacent channels in accordance with some embodiments of the present disclosure.
Figure 5B:
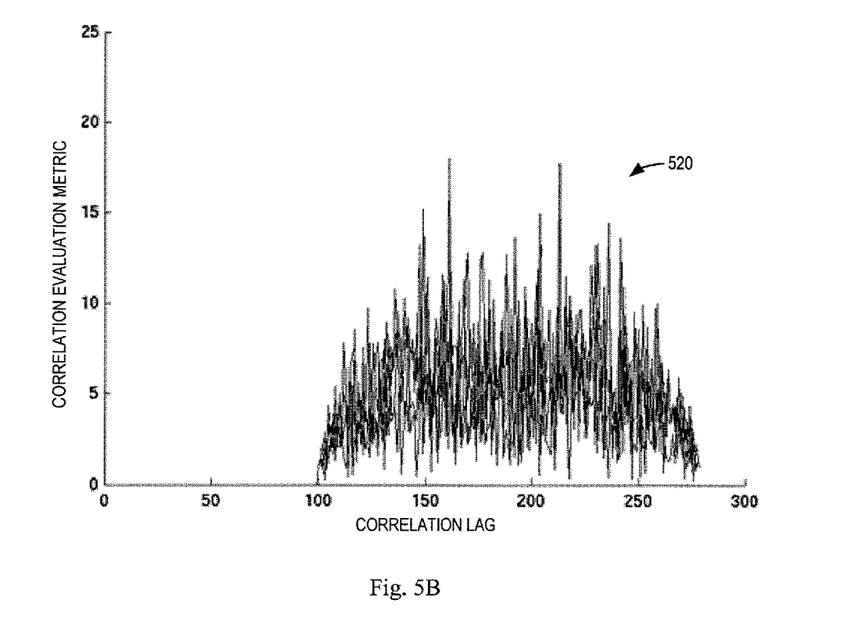

FIG. 5A shows cross-correlations 510 between any 2 TSs from legacy RACH/EC-RACH sequences and normal burst training sequences on adjacent channels. FIG. 5B shows cross-correlations 520 between the sequence TS8 for EC-RACH CC5 and TSs for legacy RACH/EC-RACH or normal burst on adjacent channels. When comparing FIGS. 5A and 5B, it can be seen that the cross-correlation properties are similar for TS8 and legacy TSs investigated. That is, the peak values for each lag in FIG. 5B are not larger than for the corresponding legacy evaluation in FIG. 5A, and the shapes of the plots are roughly the same.

According to the evaluation in interference, auto-correlation, and cross-correlation, by using the new training sequence TS8 for CC5, it is possible to achieve a high auto-correlation, and low interference and low cross-correlations with legacy TSs in communication system. It would be appreciated that the evaluation and performance comparisons as shown in the above Tables 3-8 and with reference to FIGS. 3-5B are provided merely for the purpose of illustration, without suggesting any limitations as to the scope of the present disclosure.

Figure 6:
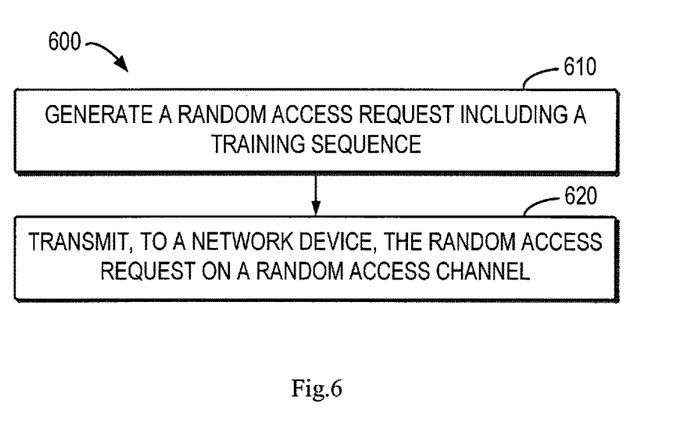
FIG. 6 shows a flowchart of an example method in accordance with some embodiments of the present disclosure.

FIG. 6 shows a flowchart of an example method 600 implemented in a terminal device in a wireless communication system in accordance with some embodiments of the present disclosure. The method 600 can be implemented in the terminal device 120 as shown in FIG. 1. For the purpose of discussion, the method 600 will be described from the perspective of the terminal device 120 with reference to FIG. 1.

At block 610, the terminal device 120 generates a random access request including a training sequence. The training sequence is configured at least partially based on a requirement of a coverage gain for a predetermined coverage class five, CC5, of the terminal device 120. At block 620, the terminal device 120 transmits, to a network device 110, the random access request on a random access channel.

In some embodiments, a length of the training sequence is in a range from 100 bits to 180 bits.

In some embodiments, the length of the training sequence includes a length of 140 bits.

In some embodiments, the training sequence is configured as 1 1 1 0 1 1 1 0 1 1 0 0 0 1 1 1 0 0 0 0 0 1 0 0 1 1 1 1 0 1 0 0 1 0 0 1 1 1 0 0 1 0 0 0 1 1 0 1 1 0 1 0 0 1 1 1 0 0 0 1 1 1 1 0 1 0 1 0 1 0 1 1 0 1 1 0 0 1 0 1 1 1 0 0 0 1 1 1 0 1 1 1 1 1 1 1 0 1 0 1 1 0 1 0 1 1 1 0 1 0 0 0 0 0 1 1 0 1 1 0 1 1 1 1 1 0 1 1 1 1 0 0 1 1 1 0 0 1 0.

In some embodiments, the training sequence is configured further based on one or more of the following: an auto-correlation of the training sequence, a cross-correlation between the training sequence and one or more further training sequences for one or more further coverage classes, and an interference between the random access channel and one or more further random access channels.

In some embodiments, the random access channel includes an extended coverage random access channel, EC-RACH.

In some embodiments, the wireless communication system is an Extended Coverage Global System for Mobile Internet of Things (EC-GSM-IoT) system.

In some embodiments, the random access request including the training sequence is generated by the terminal device 120 responsive to receiving an indication that the network device 110 supports the training sequence.

It is to be understood that all operations and features related to the terminal device 120 described above with reference to FIGS. 2 and 5B are likewise applicable to the method 600 and have similar effects. For the purpose of simplification, the details will be omitted.

Figure 7:
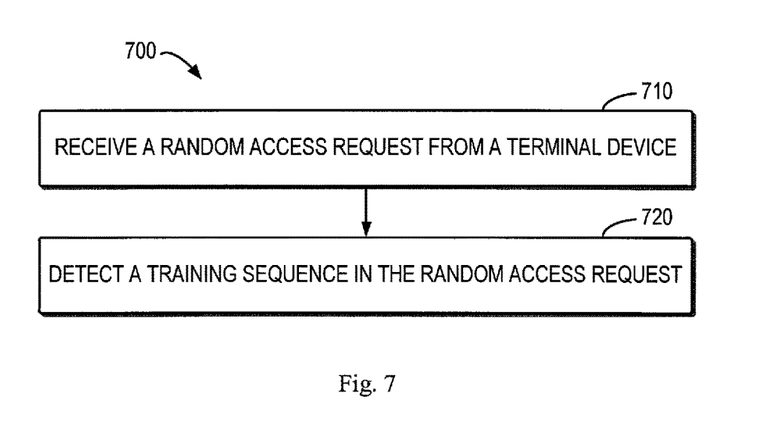
FIG. 7 shows a flowchart of an example method in accordance with some other embodiments of the present disclosure.

FIG. 7 shows a flowchart of an example method 700 in a network device in a wireless communication system in accordance with some embodiments of the present disclosure. The method 700 can be implemented in the network device 110 as shown in FIG. 1. For the purpose of discussion, the method 700 will be described from the perspective of the network device 110 with reference to FIG. 1.

At block 710, the network device 110 receives a random access request from a terminal device 120 on a random access channel. At block 720, the network device 110 detects a training sequence in the random access request. The training sequence is configured at least partially based on a requirement of a coverage gain for a predetermined coverage class five, CC5, of the terminal device 120.

In some embodiments, the method 700 further includes performing channel estimation based on the detected training sequence.

In some embodiments, the method 700 further includes determining timing advance for an uplink from the terminal device 120 to the network device 110 based on the detected training sequence.

In some embodiments, a length of the training sequence is in a range from 100 bits to 180 bits.

In some embodiments, the length of the training sequence includes a length of 140 bits.

In some embodiments, the training sequence is configured as 1 1 1 0 1 1 1 0 1 1 0 0 0 1 1 1 0 0 0 0 0 1 0 0 1 1 1 1 0 1 0 0 1 0 0 1 1 1 0 0 1 0 0 0 1 1 0 1 1 0 1 0 0 1 1 1 0 0 0 1 1 1 1 0 1 0 1 0 1 0 1 1 0 1 1 0 0 1 0 1 1 1 0 0 0 1 1 1 0 1 1 1 1 1 1 1 0 1 0 1 1 0 1 0 1 1 1 0 1 0 0 0 0 0 1 1 0 1 1 0 1 1 1 1 1 0 1 1 1 1 0 0 1 1 1 0 0 1 0.

In some embodiments, the training sequence is configured further based on one or more of the following: an auto-correlation of the training sequence, a cross-correlation between the training sequence and one or more further training sequences for one or more further coverage classes, and an interference between the random access channel and one or more further random access channels.

In some embodiments, the random access channel includes an EC-RACH.

In some embodiments, the wireless communication system is an EC-GSM-IoT system.

In some embodiments, the method 700 further includes transmitting, to the terminal device 120, an indication that the network device 110 supports the training sequence.

It is to be understood that all operations and features related to the network device 110 described above with reference to FIGS. 2 and 5B are likewise applicable to the method 700 and have similar effects. For the purpose of simplification, the details will be omitted.

Figure 8:
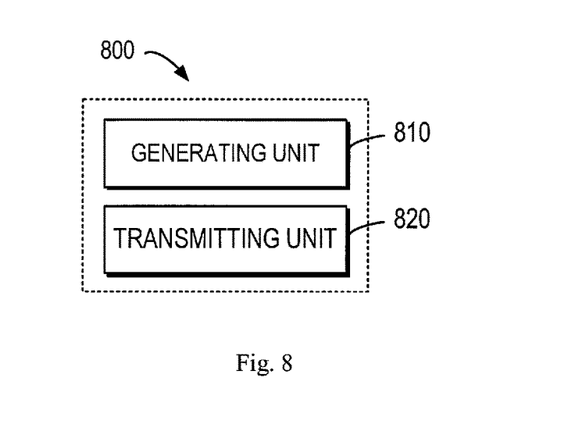
FIG. 8 is a block diagram of an apparatus at a terminal device in accordance with some embodiments of the present disclosure.

FIG. 8 shows a block diagram of an apparatus 800 at a terminal device in accordance with some embodiments of the present disclosure. The apparatus 800 can be implemented as or implemented in the terminal device 120 as shown in FIGS. 1 and 2. As shown, the apparatus 800 includes a generating unit 810 configured to generate a random access request including a training sequence. The training sequence is configured at least partially based on a requirement of a coverage gain for a predetermined coverage class five, CC5, of the terminal device 120. The apparatus 800 further includes a transmitting unit 820 configured to transmit, to a network device 110, the random access request on a random access channel.

In some embodiments, a length of the training sequence is in a range from 100 bits to 180 bits.

In some embodiments, the length of the training sequence includes a length of 140 bits.

In some embodiments, the training sequence is configured as 1 1 1 0 1 1 1 0 1 1 0 0 0 1 1 1 0 0 0 0 0 1 0 0 1 1 1 1 0 1 0 0 1 0 0 1 1 1 0 0 1 0 0 0 1 1 0 1 1 0 1 0 0 1 1 1 0 0 0 1 1 1 1 0 1 0 1 0 1 0 1 1 0 1 1 0 0 1 0 1 1 1 0 0 0 1 1 1 0 1 1 1 1 1 1 1 0 1 0 1 1 0 1 0 1 1 1 0 1 0 0 0 0 0 1 1 0 1 1 0 1 1 1 1 1 0 1 1 1 1 0 0 1 1 1 0 0 1 0.

In some embodiments, the training sequence is configured further based on one or more of the following: an auto-correlation of the training sequence, a cross-correlation between the training sequence and one or more further training sequences for one or more further coverage classes, and an interference between the random access channel and one or more further random access channels.

In some embodiments, the random access channel includes an EC-RACH.

In some embodiments, the wireless communication system is an EC-GSM-IoT system.

In some embodiments, the generating unit 810 is configured to, in response to receiving an indication that the network device 110 supports the training sequence, generate the random access request including the training sequence.

Figure 9:
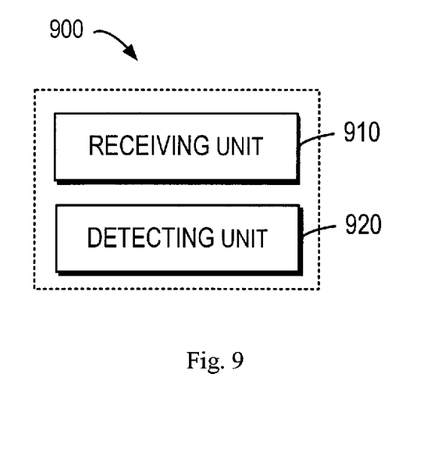
FIG. 9 is a block diagram of an apparatus at a network device in accordance with some embodiments of the present disclosure.

FIG. 9 shows a block diagram of an apparatus 900 at a terminal device in accordance with some embodiments of the present disclosure. The apparatus 900 can be implemented as or implemented in the network device 110 as shown in FIGS. 1 and 2. As shown, the apparatus 900 includes a receiving unit 910 configured to receive a random access request from a terminal device 120 on a random access channel. The apparatus 900 further a detecting unit 920 configured to detect a training sequence in the random access request. The training sequence is configured at least partially based on a requirement of a coverage gain for a predetermined coverage class five, CC5, of the terminal device 120.

In some embodiments, the apparatus 900 further includes a performing unit configured to perform channel estimation based on the detected training sequence.

In some embodiments, the apparatus 900 further includes a determining unit configured to determine timing advance for an uplink from the terminal device 120 to the network device 110 based on the detected training sequence.

In some embodiments, a length of the training sequence is in a range from 100 bits to 180 bits.

In some embodiments, the length of the training sequence includes a length of 140 bits.

In some embodiments, the training sequence is configured as 1 1 1 0 1 1 1 0 1 1 0 0 0 1 1 1 0 0 0 0 0 1 0 0 1 1 1 1 0 1 0 0 1 0 0 1 1 1 0 0 1 0 0 0 1 1 0 1 1 0 1 0 0 1 1 1 0 0 0 1 1 1 1 0 1 0 1 0 1 0 1 1 0 1 1 0 0 1 0 1 1 1 0 0 0 1 1 1 0 1 1 1 1 1 1 1 0 1 0 1 1 0 1 0 1 1 1 0 1 0 0 0 0 0 1 1 0 1 1 0 1 1 1 1 1 0 1 1 1 1 0 0 1 1 1 0 0 1 0.

In some embodiments, the training sequence is configured further based on one or more of the following: an auto-correlation of the training sequence, a cross-correlation between the training sequence and one or more further training sequences for one or more further coverage classes, and an interference between the random access channel and one or more further random access channels.

In some embodiments, the random access channel includes an EC-RACH.

In some embodiments, the wireless communication system is an EC-GSM-IoT system.

In some embodiments, the apparatus 900 further includes a transmitting unit configured to transmit, to the terminal device 120, an indication that the network device 110 supports the training sequence.

It should be appreciated that units included in the apparatuses 800 and 900 correspond to the blocks of the process 200 as well as the methods 600 and 700. Therefore, all operations and features described above with reference to FIGS. 2 to 5B are likewise applicable to the units included in the apparatuses 800 and 900 and have similar effects. For the purpose of simplification, the details will be omitted.

The units included in the apparatuses 800 and 900 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses 800 and 900 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 10:
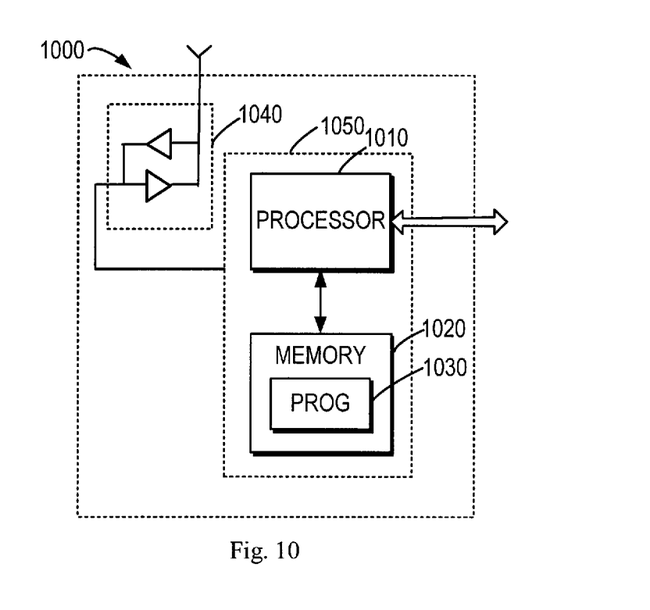
FIG. 10 is a simplified block diagram of a device that is suitable for implementing embodiments of the present disclosure.

FIG. 10 is a simplified block diagram of a device 1000 that is suitable for implementing embodiments of the present disclosure. The device 1000 can be considered as a further example implementation of the terminal device 120 or the network device 110 as shown in FIGS. 1 and 2. Accordingly, the device 1000 can be implemented at or as at least a part of the terminal device 120 or the network device 110.

As shown, the device 1000 includes a processor 1010, a memory 1020 coupled to the processor 1010, a suitable transmitter (TX) and receiver (RX) 1040 coupled to the processor 1010, and a communication interface coupled to the TX/RX 1040. The memory 1020 stores at least a part of a program 1030. The TX/RX 1040 is for bidirectional communications. The TX/RX 1040 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1030 is assumed to include program instructions that, when executed by the associated processor 1010, enable the device 1000 to operate in accordance with the embodiments of the present disclosure, as discussed herein with reference to FIGS. 2 to 9. The embodiments herein may be implemented by computer software executable by the processor 1010 of the device 1000, or by hardware, or by a combination of software and hardware. The processor 1010 may be configured to implement various embodiments of the present disclosure. Furthermore, a combination of the processor 1010 and memory 1020 may form processing means 1050 adapted to implement various embodiments of the present disclosure.

The memory 1020 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1020 is shown in the device 1000, there may be several physically distinct memory modules in the device 1000. The processor 1010 may be of any type suitable to the local technical network, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2, 6, and 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented in a terminal device in a wireless communication system, comprising:
 generating a random access request including a training sequence, wherein the training sequence is configured at least partially based on a requirement of a coverage gain for a predetermined coverage class five (CC5) of the terminal device, and wherein the training sequence is configured as 1 1 1 0 1 1 1 0 1 1 0 0 0 1 1 1 0 0 0 0 0 1 0 0 1 1 1 1 0 1 0 0 1 0 0 1 1 1 0 0 1 0 0 0 1 1

0 1 1 0 1 0 0 1 1 1 0 0 0 1 1 1 1 0 1 0 1 0 1 0 1 1 0
1 1 0 0 1 0 1 1 1 0 0 0 1 1 1 0 1 1 1 1 1 1 1 1 0 1 0
1 1 0 1 0 1 1 1 0 1 0 0 0 0 0 1 1 0 1 1 0 1 1 1 1 1 0
1 1 1 1 0 0 1 1 1 0 0 1 0; and
    transmitting, to a network device, the random access request on a random access channel.

2. The method of claim 1, wherein the transmitting comprises transmitting the random access request as an access burst.

3. The method of claim 1, wherein the transmitting comprises transmitting the random access request as an Extended Synchronization Access Burst.

4. The method of claim 1, wherein the training sequence is configured further based on one or more of the following:
    an auto-correlation of the training sequence,
    a cross-correlation between the training sequence and one or more further training sequences for one or more further coverage classes, and
    an interference between the random access channel and one or more further random access channels.

5. The method of claim 1, wherein the random access channel includes an extended coverage random access channel (EC-RACH).

6. The method of claim 1, wherein the wireless communication system is an Extended Coverage Global System for Mobile Internet of Things (EC-GSM-IoT) system.

7. The method of claim 1, wherein generating the random access request including the training sequence comprises:
    in response to receiving an indication that the network device supports the training sequence, generating the random access request including the training sequence.

8. A method implemented in a network device in a wireless communication system, comprising:
    receiving a random access request from a terminal device on a random access channel; and
    detecting a training sequence in the random access request, wherein the training sequence is configured at least partially based on a requirement of a coverage gain for a predetermined coverage class five (CC5) of the terminal device, and wherein the training sequence is configured as 1 1 1 0 1 1 1 0 1 1 0 0 0 1 1 1 0 0 0 0 0 1 0 0 1 1 1 1 0 1 0 0 1 0 0 1 1 1 0 0 1 0 0 0 1 1 0 1 1 0 1 0 0 1 1 1 0 0 0 1 1 1 1 0 1 0 1 0 1 0 1 1 0 1 1 0 0 1 0 1 1 1 0 0 0 1 1 1 0 1 1 1 1 1 1 1 0 1 0 1 1 0 1 0 1 1 1 0 1 0 0 0 0 0 1 1 0 1 1 0 1 1 1 1 1 0 1 1 1 1 0 0 1 1 1 0 0 1 0.

9. The method of claim 8, further comprising:
performing channel estimation based on the detected training sequence.

10. The method of claim 8, further comprising:
determining timing advance for an uplink from the terminal device to the network device based on the detected training sequence.

11. The method of claim 8, wherein the receiving comprises receiving the random access request as an access burst.

12. The method of claim 8, wherein the receiving comprises receiving the random access request as an Extended Synchronization Access Burst.

13. The method of claim 8, wherein the training sequence is configured further based on one or more of the following:
    an auto-correlation of the training sequence,
    a cross-correlation between the training sequence and one or more further training sequences for one or more further coverage classes, and
    an interference between the random access channel and one or more further random access channels.

14. The method of claim 8, wherein the random access channel includes an extended coverage random access channel (EC-RACH).

15. The method of claim 8, wherein the wireless communication system is an Extended Coverage Global System for Mobile Internet of Things (EC-GSM-IoT) system.

16. The method of claim 8, further comprising:
transmitting, to the terminal device, an indication that the network device supports the training sequence.

17. An apparatus at a terminal device in a wireless communication system, comprising:
    a processor; and
    a memory coupled to the processor and storing instructions thereon, the instructions, when executed by the processor, cause the apparatus to:
        generate a random access request including a training sequence, wherein the training sequence is configured at least partially based on a requirement of a coverage gain for a predetermined coverage class five (CC5) of the terminal device, and wherein the training sequence is configured as 1 1 1 0 1 1 1 0 1 1 0 0 0 1 1 1 0 0 0 0 0 1 0 0 1 1 1 1 0 1 0 0 1 0 0 1 1 1 0 0 1 0 0 0 1 1 0 1 1 0 1 0 0 1 1 1 0 0 0 1 1 1 1 0 1 0 1 0 1 0 1 1 0 1 1 0 0 1 0 1 1 1 0 0 0 1 1 1 0 1 1 1 1 1 1 1 0 1 0 0 1 1 0 1 1 0 1 1 1 1 0 1 1 1 1 0 0 1 1 1 0 0 1 0; and
        transmit, to a network device, the random access request on a random access channel.

18. An apparatus at a network device in a wireless communication system, comprising:
    a processor; and
    a memory coupled to the processor and storing instructions thereon, the instructions, when executed by the processor, cause the apparatus to:
receive a random access request from a terminal device on a random access channel; and
detect a training sequence in the random access request, wherein the training sequence is configured at least partially based on a requirement of a coverage gain for a predetermined coverage class five (CC5) of the terminal device, and wherein the training sequence is configured as 1 1 1 0 1 1 1 0 1 1 0 0 0 1 1 1 0 0 0 0 1 0 0 1 1 1 1 0 1 0 0 1 0 0 1 1 1 0 0 1 0 0 0 1 1 0 1 1 0 1 0 0 1 1 1 0 0 0 1 1 1 1 0 1 0 1 0 1 0 1 1 0 1 1 0 0 1 0 1 1 1 0 0 0 1 1 1 0 1 1 1 1 1 1 1 1 0 1 0 1 1 0 1 0 0 0 0 0 1 1 0 1 1 0 1 1 1 1 1 0 1 1 1 1 0 0 1 1 1 0 0 1 0.

* * * * *